Figure 1:
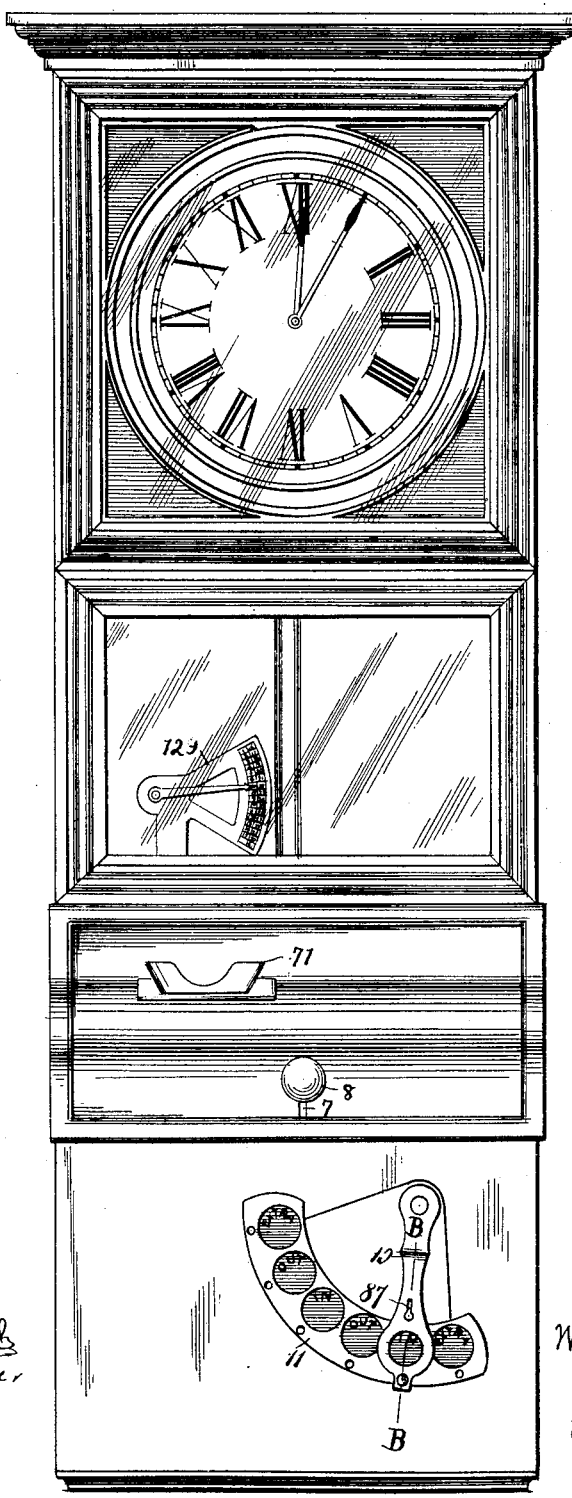

No. 671,128. Patented Apr. 2, 1901.
W. LE G. BUNDY.
WORKMAN'S TIME RECORDER.
(Application filed Oct. 25, 1899.)

(No Model.) 8 Sheets—Sheet 1.

WITNESSES:

INVENTOR
Willard Le Grand Bundy
BY
Kenyon & Kenyon
ATTORNEYS

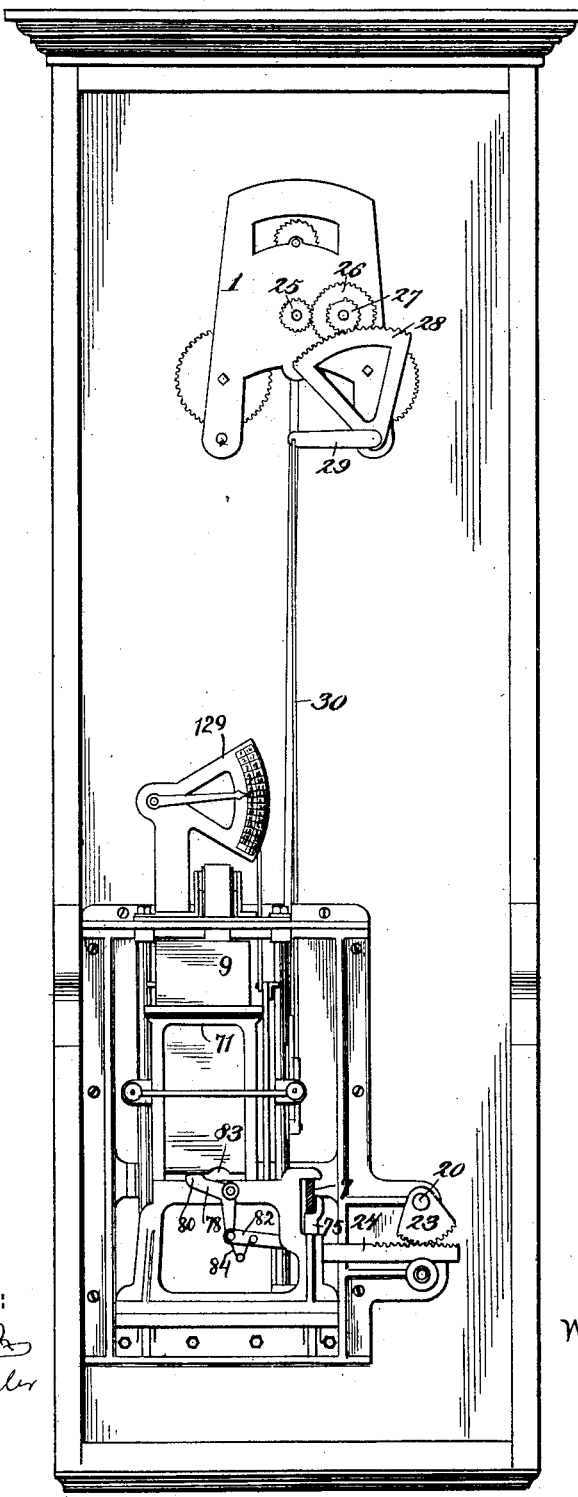

No. 671,128. Patented Apr. 2, 1901.
W. LE G. BUNDY.
WORKMAN'S TIME RECORDER.
(Application filed Oct. 25, 1899.)
(No Model.) 8 Sheets—Sheet 3.
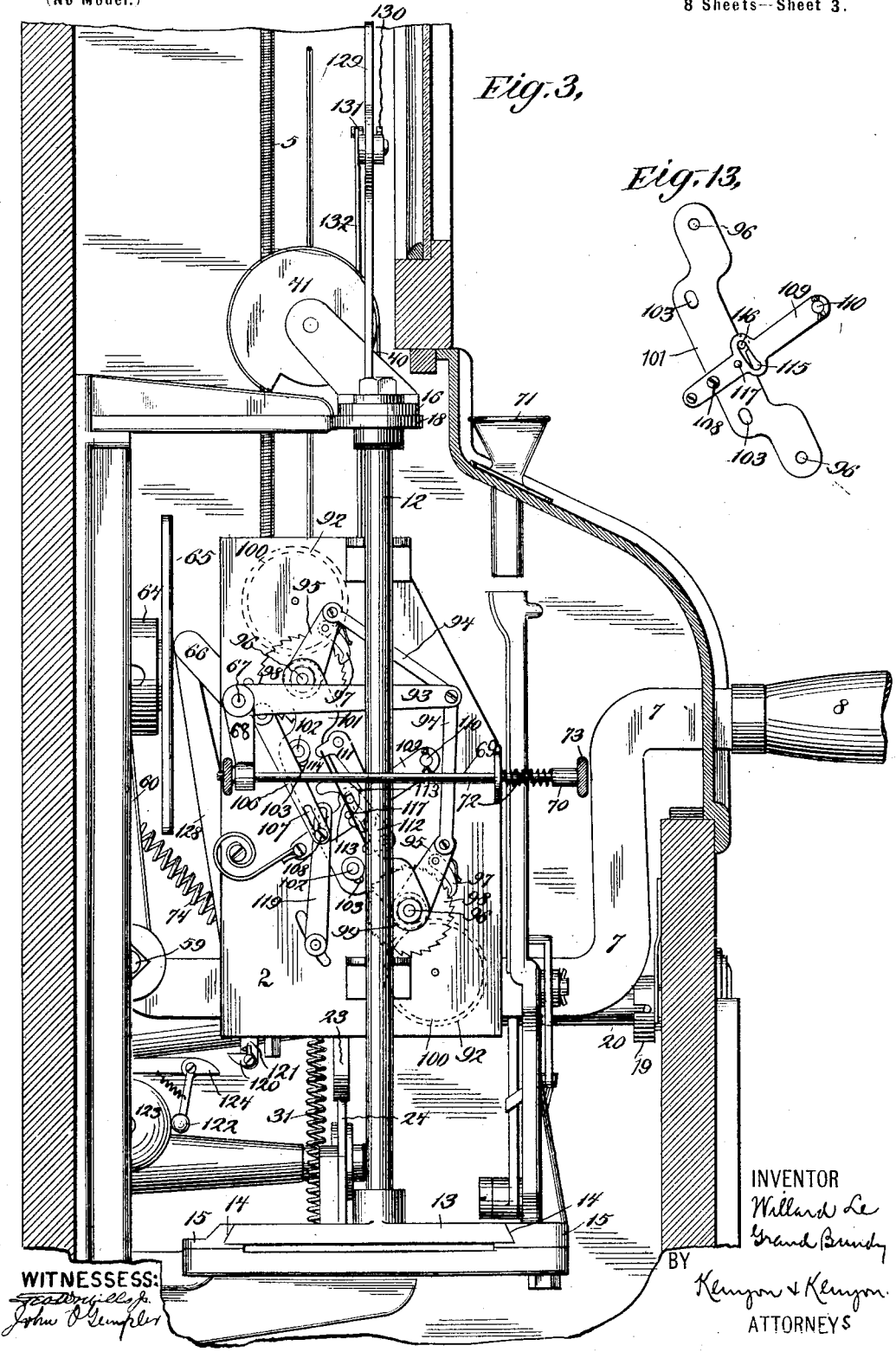
INVENTOR
Willard Le
Grand Bundy
BY
Kenyon & Kenyon.
ATTORNEYS

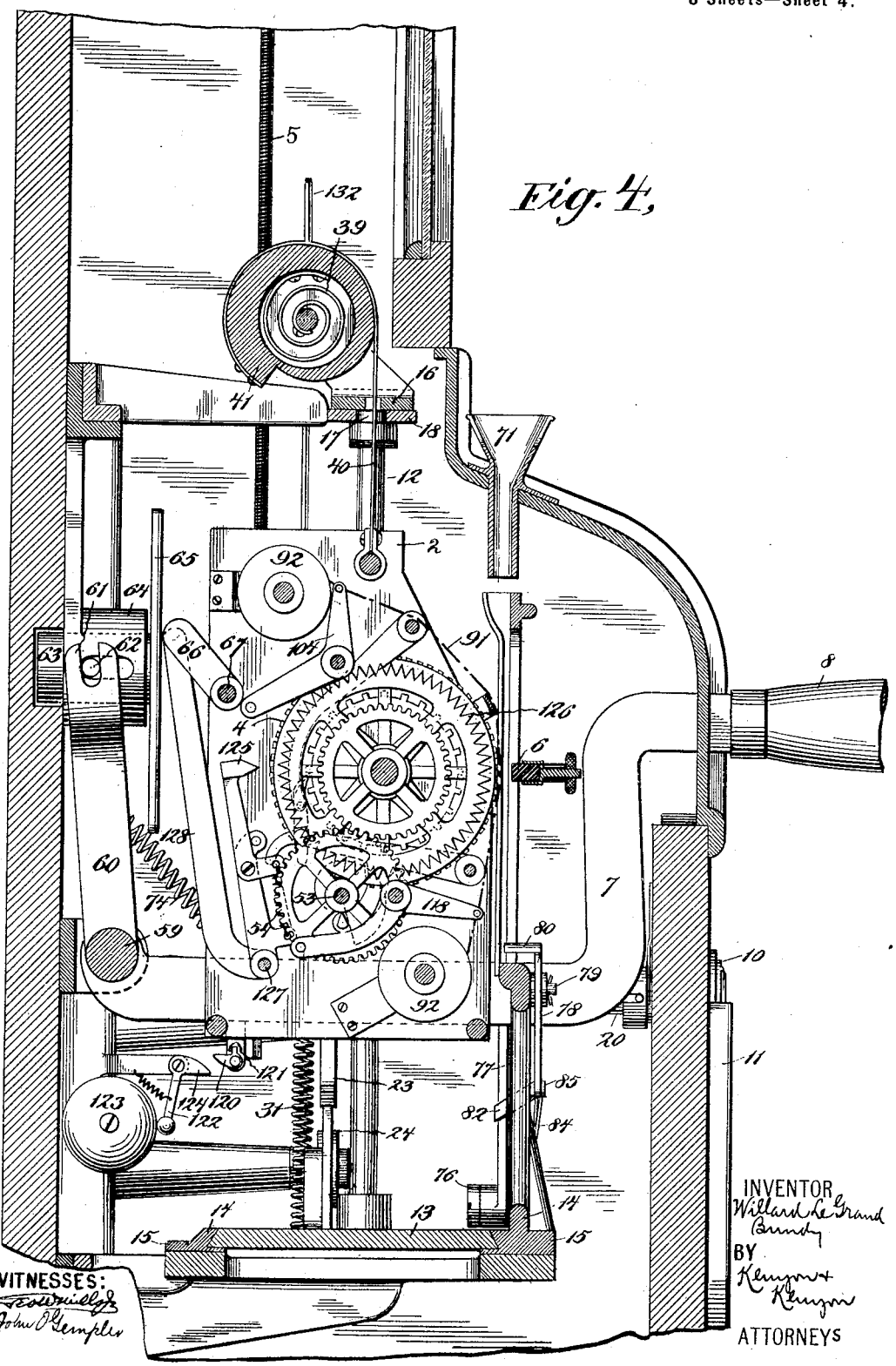

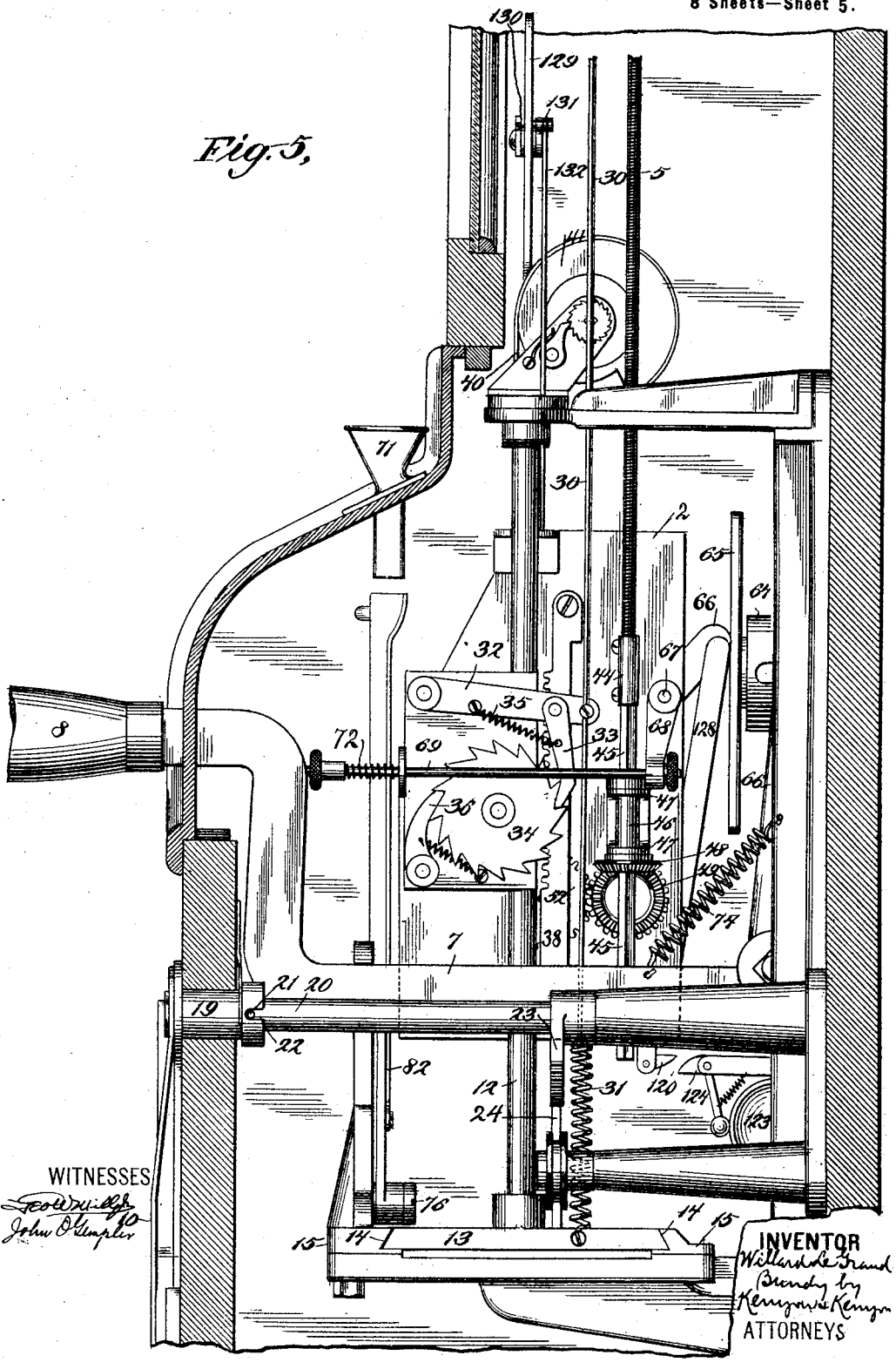

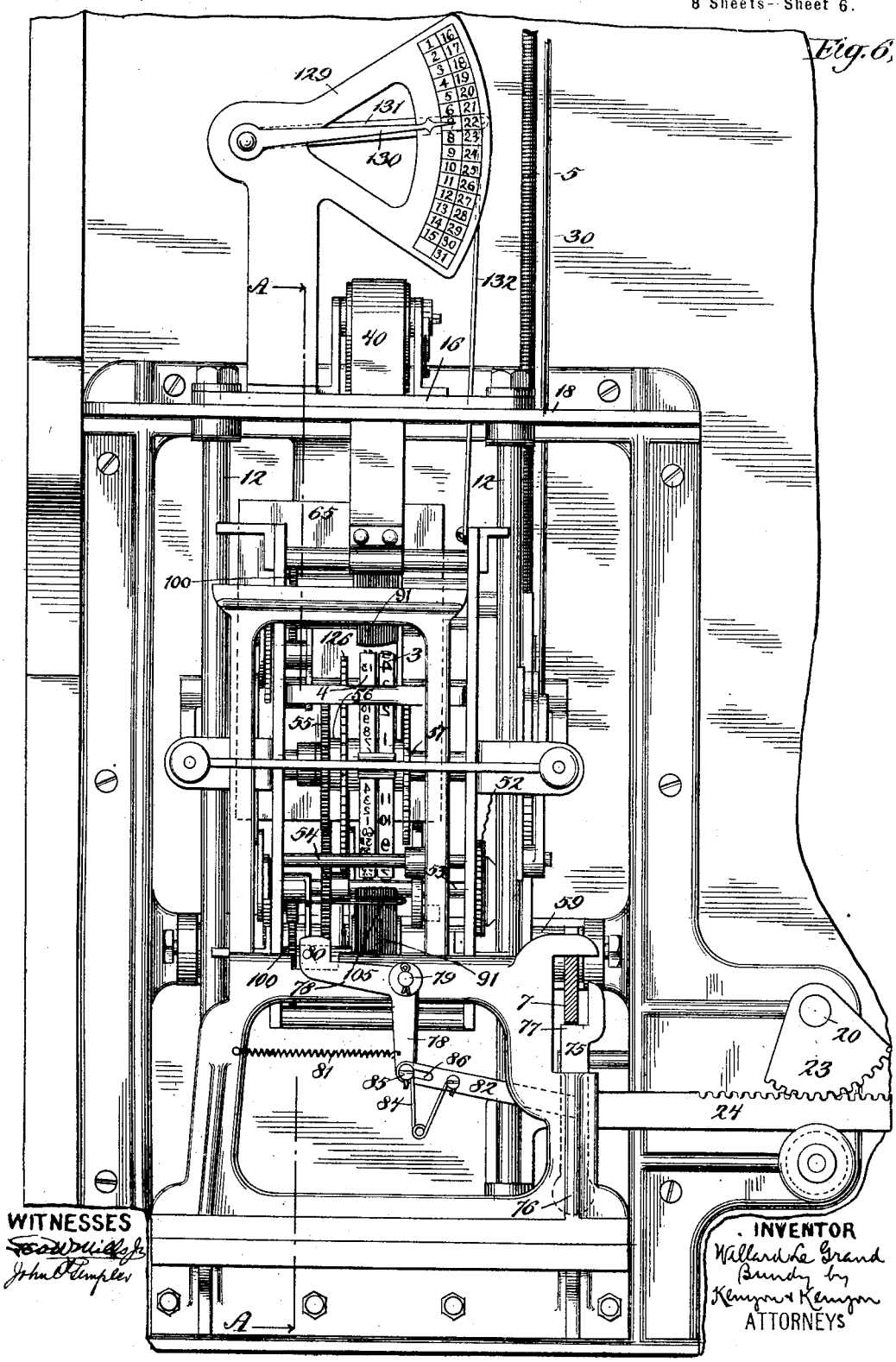

No. 671,128. Patented Apr. 2, 1901.
W. LE G. BUNDY.
WORKMAN'S TIME RECORDER.
(Application filed Oct. 25, 1899.)
(No Model.) 8 Sheets—Sheet 7.
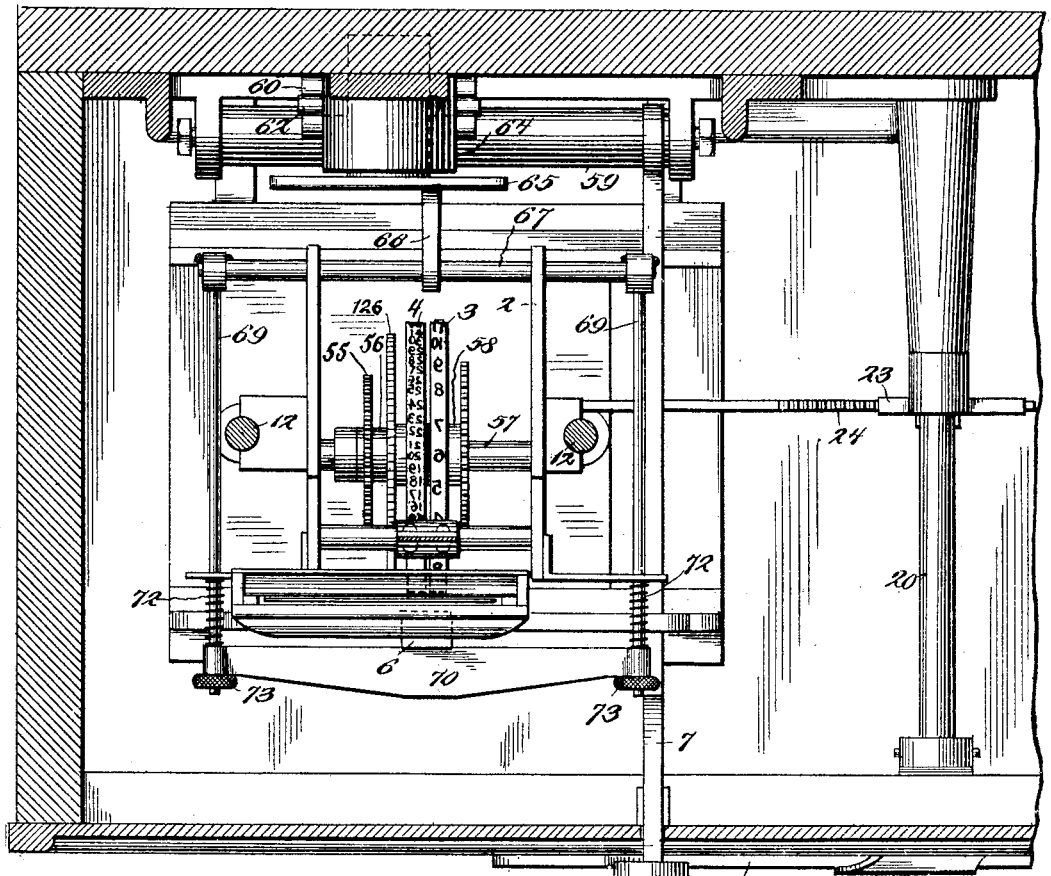
INVENTOR
Willard Le Grand Bundy
BY Kenyon & Kenyon
ATTORNEYS No. 671,128. Patented Apr. 2, 1901.
W. LE G. BUNDY.
WORKMAN'S TIME RECORDER.
(Application filed Oct. 25, 1899.)
(No Model.) 8 Sheets—Sheet 8.
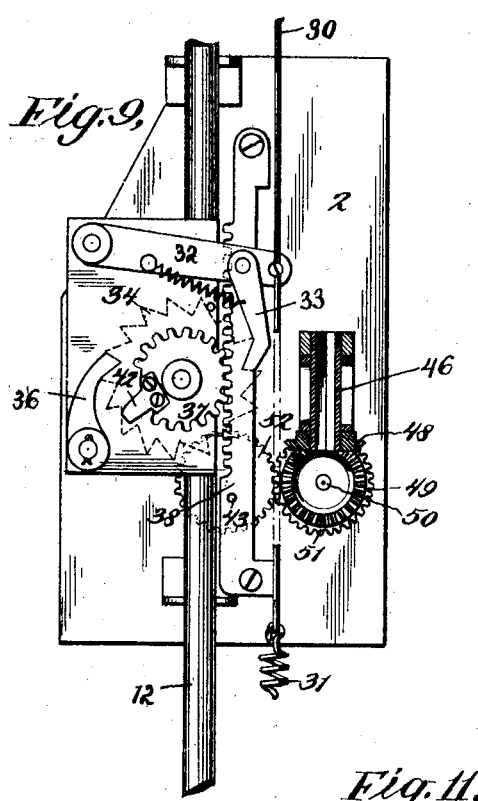
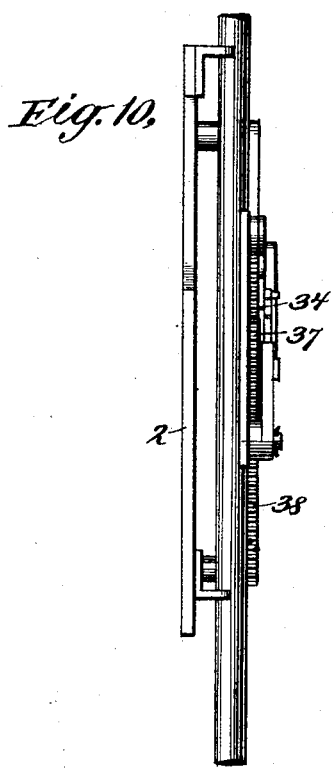
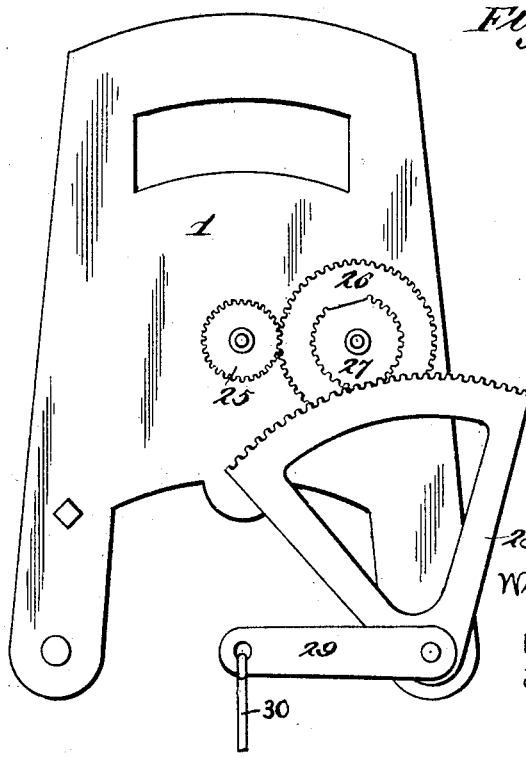
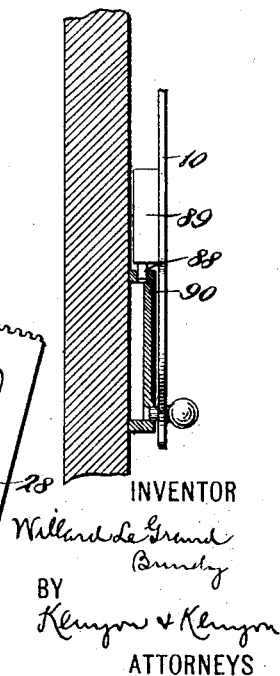
WITNESSES:
INVENTOR
Willard Le Grand Bundy
BY
Kenyon & Kenyon
ATTORNEYS
THE NORRIS PETERS CO., PHOTO-LITHO., WASHINGTON, D. C.

UNITED STATES PATENT OFFICE.

WILLARD LE GRAND BUNDY, OF BINGHAMTON, NEW YORK, ASSIGNOR TO THE BUNDY MANUFACTURING COMPANY, OF NEW YORK.

WORKMAN'S TIME-RECORDER.

SPECIFICATION forming part of Letters Patent No. 671,123, dated April 2, 1901.

Application filed October 25, 1899. Serial No. 734,699. (No model.)

*To all whom it may concern:*

Be it known that I, WILLARD LE GRAND BUNDY, a citizen of the United States, and a resident of Binghamton, in the county of Broome and State of New York, have invented certain new and useful Improvements in Workmen's Time-Recorders, of which the following is a specification.

My invention relates to recorders, and especially to time-recorders.

It has for its object to provide a new and improved time-recorder especially fitted and adapted to make records of the time upon cards or other removable record-surfaces; also, to simplify, strengthen, and make more accurate and perfect the construction and operation of such machines and to render easier and simpler the acts to be performed by the operator for the making of an impression; to improve the means for causing the time-recording mechanism to register properly, accurately, and easily with the place upon the card or other recording-surface upon which place it is desired to cause the impression to be made; also, to provide means for driving the time-recording mechanism synchronously with a clock-movement adapted to so drive the time-recording mechanism irrespective of the movements of the clock-movement and the time-recording mechanism relative to each other; also, to provide an improved lock for preventing the operation of the impression mechanism until the card or other record-surface has been properly inserted in the recorder and means for removing the lock upon such insertion; also, to provide improved impression mechanism for a recorder; also, to provide improved mechanism for moving a carriage in a time-recorder adapted to carry the time-recording mechanism, and also means for locking the carriage.

It consists of the novel features herein shown and described.

I am aware that heretofore attempts have been made in time-recorders to print a record of the time upon cards adapted to be inserted into and removed from the time-recorder. In all such time-recorders, however, the card has been movable in one or two directions, so as to cause different places upon the card to register with a printing mechanism in order to bring the impression of the time upon the desired place upon the card. In my improved time-recorder the card remains at all times stationary and the time-recording mechanism moves, preferably, in two directions, and preferably with it are moved the impression-platen and part of the impression mechanism and also the inking devices. By thus moving the time-recording mechanism in two directions, in one of which it is automatically moved by the clock-movement, and by keeping the card or other record-surface stationary I am enabled to produce a time-recorder which is especially well fitted to make records of the time upon a card or other removable record-surface at any desired points upon such card or record-surface which is simple and strong in construction and accurate in operation and which makes the acts to be performed by the operator for the actuation of the machine of a much easier and simpler character. In my improved device the card is always in exactly the same position in the machine. It is always inserted by the operator in the same place and to the same extent, thus preventing mistakes by ignorant or careless workmen. Moreover, my improved time-recorder is so constructed that preferably it cannot be operated by the workman until the card or other record-surface has been properly inserted, or, in other words, with the card or other record-surface facing in the right direction in the right place and inserted to the full extent required to bring the card into the proper position for receiving the impression.

I am also aware that it is old in time-recorders to mount a time-strip upon a drum, moving the strip longitudinally past the printing-line by rotating the drum, and to move the time-recording wheels in such recorders in two directions, one transversely over the face of the time-strip and the other toward or away from the drum, the latter movement to produce a printing pressure; but such machines are not adapted for use with time-cards adapted to be carried by a workman and to be inserted by him for each printing operation and to be withdrawn immediately thereafter, and the movement of the time-recording wheels toward and away from the time-strip is in no sense the equivalent of the movement of my time-recording mechanisms longitudinally of the card.

I am aware that heretofore a flexible spring-shaft has been employed between a clock-movement and time-recording mechanism for the purpose of driving the latter synchronously with the clock-movement. In such cases, however, the clock-movement has always been stationary and the time-recording mechanism either stationary or movable in one direction only. In my improved device the clock-movement and the time-recording mechanism have preferably two movements relatively to each other, preferably the time-recording mechanism having the two movements and the clock-movement being stationary, and in such a case the devices referred to above are inadequate and useless. In my improved device accordingly I provide adjustable connections between the clock-movement and the time-recording mechanism for synchronizing the latter with the former, which connections are adapted to permit of the movement of one or both of the time-recording mechanism and the clock-movement relative to each other in two directions without interfering with the synchronous actuation of the time-recording mechanism. In the preferred form or embodiment of my invention shown in the drawings herein I show the time-recording mechanism as movable in both directions and the adjustable connections as composed of a flexible spring-shaft connected to and driven by the clock-movement and having a sliding connection between it and the time-recording mechanism adapted to transmit the motion of the flexible spring-shaft to the time-recording mechanism irrespective of the relative positions of the shaft and sliding connection. By my improved device I am enabled to drive the time-recording mechanism synchronously with a clock-movement, despite the fact that the said parts have two movements relatively to each other.

In the drawings accompanying this specification and forming part hereof, and in which similar reference characters in the different figures represent corresponding parts, I have shown and will now proceed to describe the preferred form or embodiment of my invention.

Referring to the embodiment of my invention shown in the drawings, Figure 1 is a front elevation of a time-recorder embodying my invention in its preferred form. Fig. 2 is a front elevation of the same with the front casing removed and with a card in position in the card-holder. Fig. 3 is a side elevation of part of the same viewed from the left-hand side of Figs. 1 and 2 with the casing removed. Fig. 4 is a vertical elevation taken on the lines A A of Fig. 6 viewed as shown by the arrow. Fig. 5 is a vertical elevation taken from the right-hand side or that opposite to Fig. 3. Fig. 6 is a front elevation with the casing removed of the part of my time-recorder containing the time-recording mechanism and surrounding parts. Fig. 7 is a plan of the impression mechanism with certain parts of the apparatus removed for the purpose of clearness. Fig. 8 is a view of one form of card adapted to be used in my improved time-recorder. Fig. 9 is a detail of part of the mechanism for imparting vertical movement to the carriage and showing part of the elastic synchronizing connection between the clock-movement and the time-recording mechanism. Fig. 10 is a side view of the part shown in Fig. 9. Fig. 11 is a detail of the sector and communicating parts for imparting movement from the clock to the carriage, and Fig. 12 is a vertical section taken on the lines B B of Fig. 1. Fig. 13 is a detail of part of the ink-ribbon-feed mechanism.

In the embodiment of my invention shown in the drawings, 1 represents a clock-movement, which may be of any desired construction.

2 is a carriage adapted, preferably, to have a movement in two directions and to carry the time-recording mechanism, which, as shown, consists of the usual hour-recording type-wheel 3 and minute-recording type-wheel 4. These time-recording wheels are driven synchronously by a clock-movement through a flexible spring-shaft 5, connected with and driven by the clock-movement and connected by a sliding connection with the time-recording wheels, so as always to drive them synchronously with the clock-movement irrespective of the movements of the time-recording mechanism.

The impression mechanism consists of an impression-platen 6 and an impression-operating device, which, as shown, consists of impression-operating lever 7, provided with a handle 8, adapted to be moved by the operator to cause an impression to be made, and suitable adjustable connections between the impression-operating lever and the platen so arranged as to permit the movements of the platen with the carriage without interfering with the operation of the impression mechanism.

My improved time-recorder is especially adapted to be used with a card or other removable record-surface—such as, for example, the card 9. (Shown in detail in Fig. 8.) Preferably this card is arranged as there shown, with horizontal columns representing different dates and with vertical columns provided with spaces representing different divisions of the day—such as, for instance, "A. M." or "P. M." and "In" or "Out" or for other purposes, such as "Lost time." The card shown in Fig. 8 is shown with horizontal spaces for fifteen days. In the operation of the recorder the impression mechanism is moved downward every day a distance equal to one space upon the card by mechanism actuated by the clock-movement, as will be presently described. The time-recording mechanism is also movable laterally from column to column by means of an arm 10, pivoted in the front casing of the machine and adapted to register with different points upon a dial 11, marked to correspond with the markings of the card. By swinging arm 10 the operator moves the time-recording mechanism, in a manner presently to be described, laterally, so as to cause it to register with any of the different vertical columns of card 9. Through the above-described vertical and horizontal movements imparted to the time-recording mechanism the type representing the time are caused to properly register with the appropriate space upon the card.

Carriage 2 is mounted upon vertical supports or guides 12, secured at the bottom to a base 13, adapted to slide laterally in grooves 14 in the framework 15 of the machine. The supports 12 are tied together at their upper ends by cross-piece 16, bolted to supports 12, as shown in Fig. 6, the upper part 17 of supports 12 sliding in a lateral groove in guide 18, forming part of the framework of the time-recorder. Supports 12, base 13, and cross-piece 16 form a strong, rigid, and durable frame upon which carriage 2 is free to move vertically and by which lateral or horizontal motion is also imparted to the carriage. The means for imparting horizontal or lateral motion to the carriage through the said frame consists of the following mechanism: Arm 10 on the front casing of the machine is keyed to sleeve 19, encircling shaft 20, as shown in Fig. 5. A pin 21 projects from the shaft into slot 22 of sleeve 19. As arm 10 is swung shaft 20 rotates and carries with it sector 23, which meshes with rack 24, secured to base 13 of the frame. As arm 10 is swung backward and forward across dial 11 base 13 with its supports and the carriage 2 are moved horizontally or laterally to different positions corresponding to the position of arm 10 on dial 11.

Vertical motion is imparted to carriage 2 and through it to the time-recording mechanism by means automatically actuated by the clock-movement, so as to impart an intermittent downward movement to the carriage. The means shown for accomplishing this consists of the following:

25 is a gear-wheel connected with the hour-wheel of the clock-movement. Through gears 26 and 27, sector 28, and arm 29, fixedly secured to the sector, an intermittent vertical feed is imparted to rod 30. Gears 25, 26, and 27 are so arranged as to cause one complete movement of sector 28 every twenty-four hours. Thus every twenty-four hours rod 30 is raised a full stroke. By that time the part of gear-wheel 27 which is not provided with teeth comes opposite sector 28, whereupon rod 30 is immediately drawn downward by spring 31, returning sector 28 to its original position and feeding the carriage downward a certain prescribed distance by means of the following mechanism: Connected to rod 30 is an arm 32, pivoted in the framework of the machine and carrying a pawl 33, held in contact with ratchet-wheel 34, also mounted in the framework of the machine, by means of spring 35.

36 is a spring-pressed pawl to prevent backward rotation of ratchet-wheel 34. Upon the same shaft with and connected to ratchet-wheel 34 is gear 37, meshing with the teeth of rack 38, secured to carriage 2. Every time rod 30 is drawn downward by spring 31 pawl 33 feeds ratchet-wheel 34 forward one tooth and through gear 37 moves rack 38, and with it carriage 2, downward on its supports until there comes opposite the rack that part of the periphery of gear 37 which is free from teeth. When this space comes opposite rack 38, the latter, and with it carriage 2, are released and both are drawn upward by means of coil-spring 39, operating through steel tape 40, secured to the carriage 2 and to spiral 41, within which spring 39 is coiled. Spring 39 is preferably made just strong enough to slightly overbalance the weight of carriage 2, so as to lift the carriage to its uppermost position when released from gear 37. By making spring 39 of such strength as to slightly counterbalance the weight of carriage 2 the carriage is made easily movable in a vertical direction. Thus spring 31 need not be made of unusual strength. Spring 31 is of course made strong enough to overcome spring 39, so that each time rod 30 is released the carriage will be fed downward a distance equal to the difference between the horizontal spaces on card 9.

By the above means the carriage is moved in one direction—namely, vertically—intermittently through means automatically actuated by the clock-movement. This automatic actuation by the clock-movement can be made at any desired intervals. In the time-recorder shown in the drawings this actuation is made once every twenty-four hours. If made every twelve hours or at any other regular periods of time, the horizontal columns on the card should of course be correspondingly changed.

The motion from the clock-movement to the carriage may be imparted by any suitable mechanism; but I prefer to actuate it through an oscillating sector, such as sector 28, because with such a sector the mechanism can be more exactly and accurately arranged and there is less dragging friction than when cams are employed.

In practice I have found that in order to permit the proper disengagement of rack 38 from gear 37 it is necessary to omit so many teeth of gear 37 that the latter gear will not bring the next succeeding tooth into operation in sufficient time to begin the feeding operation again. To overcome this objection, I provide a long tooth 42, arranged at one side of the bare spot on the periphery of the gear 37, and also a pin 43, projecting from the side of rack 38 slightly below the lowest tooth of the rack. Tooth 42 is so arranged and of such length and it and pin 43 are so positioned that at the first movement of gear 37 after rack 38 has slipped to its uppermost position tooth 42 will engage pin 43 and move the rack downward the necessary distance until the ordinary teeth of gear 37 engage rack 38 again.

By means of the vertical and the horizontal motion imparted as above described the carriage 2 and the time-recording mechanism can be moved opposite to any desired position upon the card and a record of the time be made at such place. In the time-recorder shown in the drawings the vertical movement of the carriage is automatically controlled by the clock-movement, while the horizontal movement of the carriage is under the control of the operator. For some of the broad aspects of my invention such an arrangement, however, is not essential, as the time-recording mechanism can be moved in one direction or in any two desired directions by any suitable means, and where moved automatically in one direction by clock-movement that direction need not necessarily be a vertical one, although I have found in practice that the movements of the time-recording mechanism as shown and actuated as described herein give excellent results.

The means shown in the drawings for driving the time-recording mechanism synchronously with the clock-movement will now be described.

The clock-movement 1 is shown in the drawings as arranged in the usual manner, and any clock-movement and any suitable arrangement of the same in any desired part of the mechanism may be employed. The time-recording mechanism, consisting of hour-wheel 3 and minute-recording wheel 4, are driven synchronously by and with the clock-movement by adjustable connections between them adapted to transmit motion from the clock-movement to the time-recording mechanism, and they are so arranged as to permit of the movement of the time-recording mechanism and the clock-movement or either of them relatively to each other in either or both of two directions without interfering with the synchronous driving of the time-recording mechanism by the clock-movement. In the time-recorder shown in the drawings, the time-recording mechanism is adapted to move in either one or both of two directions, while the clock-movement is stationary but so far as this part of my invention is concerned in its broad aspects this movement between the two parts need only be a relative one, and it is immaterial which one of the two parts moves and which is stationary, or even whether both of the parts move.

Referring now to the form of device shown in the drawings, the synchronous movement of the time-recording wheels is accomplished through a flexible shaft 5, preferably a spring flexible shaft. This shaft is connected with and driven by the clock-movement in any well-known manner. Between flexible shaft 5 and wheels 3 and 4 I interpose a sliding connection adapted to transmit motion from the flexible shaft to the said wheels irrespective of the relative positions of the shaft and the sliding connection. As shown, this sliding connection is constructed in the following manner: The lower end of shaft 5 passes through a collar 44 on carriage 2 and has a square or polygonal-shaped end in cross-section, 45, adapted to fit snugly into a similar-shaped opening in a hollow sleeve or hollow shaft 46, mounted in bearings 47, secured to carriage 2. End 45 of shaft 5 fits snugly inside of shaft 46, but is free to move up and down therein. This end of the shaft is made of some length, so as to permit of the rise and fall of the carriage without permitting end 45 to rise clear of sleeve 46. Shaft 46 carries at its end beveled gear 48, which meshes with bevel-gear 49 on shaft 50. Upon this same shaft is a spur-gear 51, which meshes with spur-gear 52 upon shaft 53. Upon this same shaft is another spur-gear 54, meshing with spur-gear 55 upon sleeve 56 of short shaft 57. Upon this same sleeve 56 is fixedly mounted minute-recording wheel 4. The rotation of shaft 5 thus drives minute-recording wheel 4. Hour-wheel 3 is mounted upon a sleeve 58, loose upon shaft 57, and is rotated one place every hour from minute-recording wheel 4. Any suitable mechanism for this purpose may be employed, and as this mechanism forms no part of my invention it will not be further described in detail.

By means of the flexible shaft, with its sliding connections between it and the time-recording wheels, the carriage and the time-recording mechanism are permitted to move horizontally and vertically without interfering with the driving of the time-recording mechanism by the clock-movement, the flexible shaft of the form shown in the drawings permitting the horizontal movement and the sliding connection between it and the time-recording mechanism permitting the vertical movement. By using a spring flexible shaft a locking of the time-recording wheels is permitted at the moment an impression is being made, the power being temporarily stored in the spring flexible shaft for actuating the parts when the impression is completed and the time-recording mechanism is unlocked. The locking device referred to will be presently described. It is evident that where either the clock-movement or the time-recording mechanism is to be moved in one direction only relative to the other either the flexible shaft or the sliding connection may be dispensed with.

Any suitable impression mechanism may be employed for causing an impression to be made by the time-recording mechanism upon the card or other suitable record-surface. I prefer in practice to use an impression-platen mounted upon the carriage and movable therewith and to provide an impression-operating device adapted to be moved by the operator to bring the platen and time-recording mechanism together to cause an impression to be made and to provide adjustable connections between the impression-operating device and the platen adapted to permit of the movement in either one or both of two directions of the carriage and platen without interfering with the making of the time impressions upon the card or other record-surface. I have shown such a device in the drawings herein and will now proceed to describe it.

The impression-operating device consists of lever 7, secured to rock-shaft 59.

60 is an arm secured to the rock-shaft and having a forked end 61 engaging between the forks of the same a pin 62, projecting from a plunger 63. Plunger 63 is free to move horizontally through a collar 64, secured to the framework of the machine, and carries at its inner end a pressure-plate 65. In the form shown in the drawings this pressure-plate is rectangular on its face. Arm 66, secured to rock-shaft 67, mounted in bearings in the carriage, is adapted to bear against pressure-plate 65, and as plunger 63 moves the pressure-plate 65 inward rock-shaft 67 is rocked. This rock-shaft has depending from it at each side a fixed arm 68, which at its lower end encircles a rod 69. Rods 69 are secured at their forward end to pressure-bar 70, which carries impression-platen 6. Accordingly whenever lever 7 is depressed impression-platen 6 is forced against the time-recording mechanism. The card or other record-surface is placed by the workman in card-holder 71, so as to lie between impression-platen 6 and the time-recording mechanism and receive the impression thereon.

As shown, pressure-plate 65 is stationary vertically and horizontally, while carriage 2, and with it lever 66, moves either vertically or horizontally, or both. In order to permit of such a vertical and horizontal movement of lever-arm 66 without interfering with its operative connection with pressure-plate 65, I make that plate of sufficient size and of a proper shape so as to permit both vertical and horizontal movement of arm 66, while keeping the latter arm still opposite some portion of the pressure-plate. The shape of the pressure-plate may be varied from that shown in the drawings so long as the plate and arm are always adapted to make contact with each other. By these means I provide an adjustable connection between the improved operating device and the platen which does not interfere with the movements of the one part relative to the other or with the making of the time impressions irrespective of the relative positions of the parts.

In order to adjust the pressure of the printing blow, I preferably insert springs 72 between piece 70 and a part of the framework of the carriage. By means of set-screws 73 piece 70 can be moved along rods 69 in one direction or another to adjust the pressure.

Spring 74, secured at one end to lever 7 and at the other to a part of the framework of the machine, tends to hold lever 7 and handle 8 in their upper and normal condition.

By means of my improved impression device the impression-platen can be arranged on the front of the carriage without interfering with the operation of any of the parts, and the impression-platen and the lever 66, upon which point the printing pressure is exerted upon the carriage, are exactly in line with each other, thus tending to support the parts under the pressure of the printing and relieving the mechanism from unnecessary strain, while producing a more satisfactory impression. The impression mechanism can be used at all times irrespective of the positions of the carriage.

In order to prevent a workman from operating the impression mechanism before his card is properly inserted in the card-holder, I preferably make use of a lock for preventing such operation until the card has been properly inserted. My improved mechanism for the purpose consists of the following:

75 is a locking-lever pivoted at 76 in the framework of the machine. It is provided with a shelf 77, over which operating-lever 7 is normally adapted to rest. When lever 75 is thus situated, operating-lever 7 cannot be depressed. Locking-lever 75 is tilted out of the way of lever 7 to permit the latter to be operated whenever a card is properly inserted in the card-holder by means of bell-crank 78, pivoted at 79 and having a finger 80 normally projecting slightly upward into the card-holder through an opening in the bottom of the same. A spring 81, secured to one end of bell-crank lever 78, normally holds finger 80 in its inserted position in the card-holder. Bell-crank lever 78 is pivotally connected by rod 82 with locking-lever 75. When card 9 is fully inserted into the card-holder, it rests upon finger 80, and either through the weight of the card or by pressure from the workman, as desired, lever 78 is rocked and through 82 locking-lever 75 is thrown to the right, as shown in Fig. 6, and operating-lever 7 is free and can now be moved by the workman. Until thus freed by the complete insertion of the card into the card-holder the impression mechanism cannot be operated. It is therefore necessary for a workman before he can make a record to insert his card fully into the card-holder to bring it into the proper position to receive an impression.

In order to insure that the workmen shall insert the card with the face prepared to receive the impression pointing in the proper way toward the impression-recording mechanism, I cut away a portion of the card, preferably at its lower edge, as at 83. When the card is properly inserted with the proper side toward the impression mechanism, the cut-away portion 83 will not register with finger 80, and the bottom of the card will therefore rest upon finger 80 and locking-lever 75 will be removed from its locking position. Should the card be inserted with the face in the wrong direction, the cut-away portion 83 will register with finger 80, so that the card will not rest upon finger 80, lever 78 will not be moved, and locking-lever 75 will remain in its locking position. The form and relative location of finger 80 and cut-away portion 83 can of course be widely varied, the only essential being that when the card is improperly inserted said parts will register to prevent the removal of the locking-lever, and when the card is properly inserted the card will engage with finger 80 and will remove the lock.

In order to prevent tearing or breakage of the card, the locking-lever and its unlocking mechanism are preferably made so as to be easily and delicately moved. For this purpose I preferably arrange it so that lever 7 will normally not rest upon shelf 77, a slight space being left between them, so as to permit of the ready removal of the locking-lever without friction against lever 7. Should the workman, however, depress operating-lever 7 against shelf 77, the parts might become temporarily locked or the friction be so much increased that there would be a tendency to break the edge of the card. To obviate this, I preferably arrange an adjustable spring connection between lever 78 and rod 82 to permit the movement of lever 78 irrespective of that of arm 82 and lever 75. For this purpose I provide a spring 84, fixed at one end to rod 82 and at the other end to a pin 85, projecting from lever 78 through a slot 86 in rod 82. Pin 85 is free to move in slot 86, the movement from lever 78 being communicated to rod 82 through spring 84. If locking-lever 75 is frictionally held by lever 7, spring 84 will be compressed, permitting movement of finger 80 and lever 78, and when locking-lever 75 is freed the spring 84 will then move the locking-lever from its locking position, the power being meanwhile and temporarily stored in spring 84. An elastic connection is thus provided which will prevent injury to the card without preventing the operation of the unlocking devices.

It is sometimes desirable to prevent workmen from moving the carriage horizontally, and for this purpose I provide the following locking mechanism: I provide a keyhole 87, Fig. 1, in arm 10, in which a suitable key can be inserted to operate a bolt 88 of the lock 89 on the back of arm 10, the bolt being arranged when shot so as to engage with frames 90, corresponding with the different positions on dial 11.

In order to compensate for the varying strength of coil-spring 39, Fig. 4, in its different positions and to make the upward pull upon carriage 2 as nearly equal at all times as possible, I place coil-spring 39 inside of an eccentric or spiral 41 and secure the upper end of tape 40 to this eccentric, as shown in Fig. 4. By these means the leverage of the downward pull of the carriage through tape 40 is varied, making that pull greater as spring 39 coils more tightly and grows stronger or less as the spring uncoils and grows weaker.

I preferably place the inking mechanism on the carriage. Any suitable inking mechanism may be employed. Referring to the inking mechanism shown, 91 is the inking-ribbon, and 92 92 are the ink-ribbon rolls, from one to the other of which the ink-ribbon passes and repasses. The ink-ribbon is fed forward at each actuation of impression-operating lever 7 by means of arm 93, rigidly secured to shaft 67. Arm 93 is connected by a rod 94 with feeding mechanism adapted to feed each one of rolls 92. This mechanism is arranged so that only one of these feeding mechanisms is in operation at a time. Each feeding mechanism consists of an arm 95, loosely mounted on shaft 96 and carrying a spring-pressed pawl 97 and oscillated by arm 94 as arm 93 moves up or down. Pawl 97 engages with the teeth of ratchet-wheel 98, loosely mounted on shaft 96. A gear 99 is connected with ratchet-wheel 98 and is adapted at times to mesh with gear 100 on roll 92. When one gear 99 is in mesh with gear 100 of one of the rolls, the other gear 99 is out of mesh with the gear 100 of the other roll. This is accomplished by means of the following mechanism: Both shafts 96, with their ratchet-wheels 98, are carried by a sliding plate 101, which is frictionally secured to the framework of the carriage by means of pins 102, projecting from the carriage through slots 103 in the sliding plate. This fastening is such as to hold plate 101 stationary except when moved positively, as described below.

104 is a bell-crank lever having projecting from one end a bent wire 105, through which the ink-ribbon passes. This wire is shown in Fig. 6. A knot is secured near each end of the ink-ribbon, which catches in bent wire 105 when it is desired to feed the ink-ribbon in the other direction, thus rocking lever 104. In the position of the parts shown in Fig. 3 the feeding mechanism is in mesh with the lower roll 92. In this position of the parts when lever 104 is rocked upward it pulls upward arm 106, secured to the end of lever 104. Arm 106 has at its lower end a slot 107, in which plays pin 108, secured to lever 109. In the position of the parts shown in Fig. 3 pin 108 is at the lower end of slot 107. The upward pull of arm 106 therefore rocks lever 109 upward on its pivot 110.

111 and 112 are two levers pivoted in the framework of the carriage, each having a notch 113 in its surface.

114 is a bowed spring connecting the two ends of levers 111 and 112 and tending to separate the ends thus connected. Lever 109 has near its center a slot 115, through which projects a pin 116, projecting from sliding plate 101. With the parts in the position shown in Fig. 3 lever 111 rests with its nose against pin 117, projecting from lever 109, which holds lever 111 from moving under the strain of spring 114. As arm 109 moves upward, pulled by arm 106, lever 111 follows pin 117 until notch 113 of lever 111 stands opposite to but does not engage pin 116 of plate 101. In the further movement of lever 109 the farther end of slot 115 reaches pin 116 and pulls it, and with it sliding plate 101, upward, disengaging lower gear-wheel 99 from gear-wheel 100 of the lower roll 92 and causing upper gear-wheel 99 to mesh with upper gear-wheel 100 of the upper roll 92. At the same time notch 113 of lever 111 snaps behind pin 116 and holds the parts in this position until a similar knot at the other end of the inking-ribbon engages with a similar bent wire on lever 118, which corresponds in all respects to lever 104. Lever 118 connects with an arm 119, corresponding with an arm 106 and having a similar slot through which passes pin 108 of lever 109. By the time this happens pin 108 is at the upper end of the slots in arms 106 and 119. Arm 119 is then pulled downward just as arm 106 was pulled upward, as above described, reversing the position of the parts and bringing them into the position shown in Fig. 3, feeding the ink-ribbon in the reverse direction.

The inking mechanism herein shown and above described I do not claim in this application, as I intend to claim it in another application soon to be filed.

I preferably provide bell mechanism to indicate to the workman the operation of the impression mechanism. Any suitable ringing mechanism can be used for this purpose. That shown by me consists of a spring-pressed tooth 120, mounted upon operating-lever 7 and provided with a stop 121.

122 is a spring-hammer for bell 123 and having a tooth 124, past which tooth 120 easily slips when operating-lever 7 is depressed. Upon the return of operating-lever 7 tooth 120 pulls bell-hammer 122 upward and the spring causes a blow to be given upon the bell. The bell is not rung until after an impression has been made.

125 is a locking-lever adapted to engage with the teeth of toothed wheel 126, secured to the minute-wheel, in order to lock the minute-wheel, and with it the hour-wheel, at the moment an impression is made. Locking-lever 125 is secured to an arm 128, the upper end of which bears against pressure-plate 65. As pressure-plate 65 is pushed forward through arm 128 locking-lever 125 is forced into one of the serrations of toothed segment 126, thus holding the minute-wheel rigid at the time the impression is made.

129 is a dial having an index-finger 130 to indicate the vertical movement of the carriage. The index-finger is connected by an arm 131 and rod 132 with carriage 2, so that the index-finger moves over the dial as the carriage moves up and down.

By means of my invention the card and card-holder remain stationary and fixed at all times. The operator inserts his card or other record surface always at the same place, in the same manner, and to the same extent. Mistakes on the part of the operator are thus guarded against. Moreover, the operator cannot make an impression until his card has been properly inserted, with the card facing in the right direction and completely inserted, so as to be in the proper place to receive the impression. By means of the lock on the arm 10 the carriage cannot be moved laterally except by the person having charge of the machine.

Many changes can of course be made from the devices shown in the drawings without departing from my invention.

This case is designated by me as Case A to distinguish it from another application filed by me simultaneously herewith and known as Serial No. 734,700.

What I claim as new, and desire to secure by Letters Patent, is—

1. In a time-recorder adapted to make a record of the time of its operation upon a card or other record-surface the combination of a clock-movement, time-recording mechanism driven thereby movable in two directions over the face of the card or other record-surface, means for moving it in each direction, so as to bring the time-recording mechanism opposite any desired place upon the card or record-surface, and means for causing an impression to be made by the time-recording mechanism upon the place upon the card or other suitable record-surface opposite to which it stands, whereby a record of the time may be made at any desired place upon the card or other record-surface.

2. In a time-recorder adapted to make a record of the time of its operation upon a card or other record-surface the combination of a clock-movement, time-recording mechanism driven thereby movable in two directions over the face of the card or other record-surface, means actuated by the clock-movement for moving the time-recording mechanism in one direction over the face of the card or other record-surface, means for moving it in the other direction over the face of the card or other record-surface, and means for causing an impression to be made by the time-recording mechanism upon the place upon the card or other suitable record-surface opposite to which it stands, whereby a record of the time may be made at any desired place upon the card or other record-surface.

3. In a time-recorder adapted to make a record of the time of its operation upon a card or other record-surface the combination of a clock-movement, time-recording mechanism driven thereby movable in two directions over the face of the card or other record-surface, means actuated by the clock-movement for moving the time-recording mechanism in one direction over the face of the card or other record-surface, means under the control of the operator for moving it in the other direction over the face of the card or other record-surface, and means for causing an impression to be made by the time-recording mechanism upon the place upon the card or other suitable record-surface opposite to which it stands, whereby a record of the time may be made at any desired place upon the card or other record-surface.

4. In a time-recorder adapted to make a record of the time of its operation upon a card or other record-surface the combination of a clock-movement, time-recording mechanism driven thereby, a carriage suitably mounted and movable in two directions over the face of the card or other record-surface and carrying the time-recording mechanism, means for moving the carriage in each direction so as to bring the time-recording mechanism opposite any desired place upon the card or record-surface and means for causing an impression to be made by the time-recording mechanism upon the place upon the card or other suitable record-surface opposite to which it stands, whereby a record of the time may be made at any desired place upon the card or other record-surface.

5. In a time-recorder adapted to make a record of the time of its operation upon a card or other record-surface the combination of a clock-movement, time-recording mechanism driven thereby, a carriage suitably mounted and movable in two directions over the face of the card or other record-surface and carrying the time-recording mechanism, means actuated by the clock-movement for moving the carriage in one direction over the face of the card or other record-surface, means for moving the carriage in the other direction over the face of the card or other record-surface, and means for causing an impression to be made by the time-recording mechanism upon the place upon the card or other suitable record-surface opposite to which it stands, whereby a record of the time may be made at any desired place upon the card or other record-surface.

6. In a time-recorder adapted to make a record of the time of its operation upon a card or other record-surface the combination of a clock-movement, time-recording mechanism driven thereby, a carriage suitably mounted and movable in two directions over the face of the card or other record-surface and carrying the time-recording mechanism, means actuated by the clock-movement for moving the carriage in one direction over the face of the card or other record-surface, means under the control of the operator for moving the carriage in the other direction over the face of the card or other record-surface, and means for causing an impression to be made by the time-recording mechanism upon the place upon the card or other suitable record-surface opposite to which it stands, whereby a record of the time may be made at any desired place upon the card or other record-surface.

7. In a time-recorder the combination of a clock-movement, time-recording mechanism driven thereby, a carriage suitably mounted and movable in two directions and carrying the time-recording mechanism, means for moving the carriage in each direction, an impression-platen mounted upon the carriage and movable therewith, and means for operating the impression-platen for causing an impression to be made by the time-recording mechanism upon a card or other suitable record-surface, whereby a record of the time may be made at any desired place upon the card or other record-surface.

8. In a time-recorder the combination of a clock-movement, time-recording mechanism driven thereby, a carriage suitably mounted and movable in two directions and carrying the time-recording mechanism, means actuated by the clock-movement for moving the carriage in one direction, means for moving the carriage in the other direction, an impression-platen mounted upon the carriage and movable therewith, and means for operating the impression-platen for causing an impression to be made by the time-recording mechanism upon a card or other suitable record-surface, whereby a record of the time may be made at any desired place upon the card or other record-surface.

9. In a time-recorder the combination of a clock-movement, time-recording mechanism driven thereby, a carriage suitably mounted and movable in two directions and carrying the time-recording mechanism, means actuated by the clock-movement for moving the carriage in one direction, means under the control of the operator for moving the carriage in the other direction, an impression-platen mounted upon the carriage and movable therewith, and means for operating the impression-platen for causing an impression to be made by the time-recording mechanism upon a card or other suitable record-surface, whereby a record of the time may be made at any desired place upon the card or other record-surface.

10. In a time-recorder the combination of a clock-movement, time-recording mechanism driven thereby, a carriage suitably mounted and movable in two directions and carrying the time-recording mechanism, means for moving the carriage in each direction, an impression-platen mounted upon the carriage and movable therewith, an impression-operating device adapted to be actuated by the operator to bring the platen and the time-recording mechanism together to cause an impression of the time to be made upon a card or other suitable record-surface, adjustable connections between the impression-operating device and the platen, adapted to permit the movement of the platen with the carriage without interfering with the making of the time impressions upon the card or other record-surface, whereby a record of the time may be made at any desired place upon the card or other record-surface.

11. In a recorder adapted to make a record of the time of its operation upon a card or other record-surface the combination of recording mechanism movable in two directions, over the face of the card or other record-surface, means for moving it in each direction so as to bring the time-recording mechanism opposite any desired place upon the card or record-surface, an impression-platen movable therewith, an impression-operating device adapted to be actuated by the operator to bring the platen and recording mechanism together to cause an impression to be made upon the place upon the card or other suitable record-surface opposite to which it stands, adjustable connections between the impression-operating device and the platen adapted to permit the movements of the recording mechanism and platen without interfering with the making of the impressions upon the card or other record-surface, whereby a record may be made at any desired place upon the card or other record-surface.

12. In a time-recorder the combination of a clock-movement, time-recording mechanism driven thereby, a carriage suitably mounted and movable in two directions and carrying the time-recording mechanism, an impression-platen mounted upon the carriage, means for moving the carriage in each direction, a pressure-plate connected with the impression-operating device and adapted to be moved thereby, a lever mounted upon the carriage and connected with the impression-platen and adapted to bear upon the pressure-plate and to be moved thereby to operate the impression-platen, the pressure-plate and lever being so arranged that the lever will always bear upon some portion of the surface of the pressure-plate, no matter what the position of the carriage, whereby the movement of the carriage will not interfere with the making of the time impressions upon the card or other record-surface and a record of the time may be made at any desired place upon said card or record-surface.

13. In a time-recorder the combination of a clock-movement, time-recording mechanism driven thereby, a carriage suitably mounted and movable in two directions and carrying the time-recording mechanism, means for moving the carriage in each direction, an impression-platen mounted upon the carriage and movable therewith, an impression-operating device adapted to be actuated by the operator to bring the platen and the time-recording mechanism together to cause an impression of the time to be made upon a card or other suitable record-surface, a rectangular pressure-plate mounted upon a plunger movable in bearings in the framework of the machine and connection between the plunger and the operating-lever for moving the pressure-plate, a lever mounted upon the carriage and connected with the impression-platen and adapted to bear upon the pressure-plate and to be moved thereby to operate the impression-platen, the pressure-plate and lever being so arranged that the lever will always bear upon some portion of the surface of the pressure-plate, no matter what the position of the carriage, whereby the movement of the carriage will not interfere with the making of the time impressions upon the card or other record-surface and a record of the time may be made at any desired place upon said card or record-surface.

14. In a time-recorder the combination of a clock-movement, time-recording mechanism driven thereby, a carriage suitably mounted and movable in two directions and carrying the time-recording mechanism, means for moving the carriage in each direction, an impression-platen mounted upon the carriage and movable therewith, an impression-operating device adapted to be actuated by the operator to bring the platen and the time-recording mechanism together to cause an impression of the time to be made upon a card or other suitable record-surface, a pressure-plate mounted upon a plunger movable in bearings in the framework of the machine and connections between the plunger and the operating-lever for moving the pressure-plate, a lever mounted upon the carriage and adapted to bear upon the pressure-plate and to be moved thereby, an ink-ribbon and mechanism for feeding the ink-ribbon mounted upon the carriage, connections between the said lever and the ink-ribbon, feeding mechanism for operating the latter when the lever is moved by the pressure-plate, whereby the movements of the carriage will not interfere with the making of the time impressions upon the card or other record-surface or with the feeding of the ink-ribbon and whereby the ink-ribbon may be fed upon each operation of the machine and a record of the time be made upon any desired place upon the card or other record-surface.

15. In a time-recorder the combination of a clock-movement, time-recording mechanism driven thereby, a carriage suitably mounted and movable in two directions and carrying the time-recording mechanism, means for moving the carriage in each direction, an impression-platen mounted upon the carriage and movable therewith, an impression-operating device adapted to be actuated by the operator to bring the platen and the time-recording mechanism together to cause an impression of the time to be made upon a card or other suitable record-surface, a pressure-plate mounted upon a plunger movable in bearings in the framework of the machine and connections between the plunger and the operating-lever for moving the pressure-plate, a lever adapted to bear upon the pressure-plate and to be moved thereby, a locking device operated by the said lever for locking the time-recording mechanism during the making of the impression, the said lever and the said pressure-plate being so arranged that the lever will bear upon some point of the surface of the pressure-plate, no matter what the position of the carriage, whereby a record of the time may be made at any desired place upon the card or other record-surface irrespective of the position of the carriage and whereby the time-recording mechanism will be held rigid during the making of the impression.

16. In a time-recorder adapted to make a record of the time of its operation upon a card or other record-surface the combination of a clock-movement, time-recording mechanism movable in two directions over the face of the card or other record-surface, adjustable connections between the clock-movement and the time-recording mechanism to transmit motion from the former to the latter to drive the latter synchronously with the former adapted to permit of the movement of the time-recording mechanism in either or both directions without interference with the synchronous driving of the time-recording mechanism, means for moving the time-recording mechanism in each direction so as to bring the time-recording mechanism opposite any desired place upon the card or record-surface and suitable impression mechanism, whereby a record of the time may be made at any desired place upon the card or other record-surface irrespective of the movements of the time-recording mechanism.

17. In a time-recorder adapted to make a record of the time of its operation upon a card or other record-surface the combination of a clock-movement, time-recording mechanism movable in two directions over the face of the card or other record-surface, a flexible shaft connected with and driven by the clock-movement, a sliding connection between the flexible shaft and the time-recording mechanism adapted to transmit the motion of the flexible shaft to the time-recording mechanism irrespective of the relative positions of the shaft and sliding connection, whereby the time-recording mechanism may be moved in either or both directions without interference with the synchronous driving of the time-recording mechanism, means for moving the time-recording mechanism in each direction so as to bring the time-recording mechanism opposite any desired place upon the card or record-surface and suitable impression mechanism, whereby a record of the time may be made at any desired place upon the card or other record-surface irrespective of the movements of the time-recording mechanism.

18. In a time-recorder adapted to make a record of the time of its operation upon a card or other record-surface the combination of a clock-movement, time-recording mechanism movable in two directions over the face of the card or other record-surface, a flexible shaft connected with and driven by the clock-movement, and adapted to bend and move in one direction with the time-recording mechanism, a sliding connection between the flexible shaft and the time-recording mechanism adapted to permit movement of the flexible shaft and sliding connection relatively to each other in the other direction of movement of the time-recording mechanism, whereby the motion of the flexible shaft may be transmitted to the time-recording mechanism irrespective of the relative positions of the shaft and sliding connection, means for moving the time-recording mechanism in each direction so as to bring the time-recording mechanism opposite any desired place upon the card or record-surface and suitable impression mechanism, whereby a record of the time may be made at any desired place upon the card or other record-surface irrespective of the movements of the time-recording mechanism.

19. In a time-recorder the combination of a clock-movement, time-recording mechanism driven thereby, a carriage suitably mounted upon supports and adapted to move thereon and to carry the time-recording mechanism, means actuated by the clock-movement for moving the carriage along its supports, and means for causing an impression to be made by the time-recording mechanism upon a card or other suitable record-surface, whereby a record of the time may be made at any desired place upon the card or other record-surface along the line of movement of the carriage.

20. In a time-recorder the combination of a clock-movement, time-recording mechanism driven thereby, a carriage suitably mounted upon supports and adapted to move thereon and to carry the time-recording mechanism, a spring for moving the carriage, intermittently strained by the clock-movement and released to intermittently move the carriage and means for returning the carriage to its original position after it has reached the limit of its travel, and means for causing an impression to be made by the time-recording mechanism upon a card or other suitable record-surface, whereby a record of the time may be made at any desired place upon the card or other record-surface along the line of movement of the carriage.

21. In a time-recorder the combination of a clock-movement, time-recording mechanism driven thereby, a carriage suitably mounted upon supports and adapted to move thereon and to carry the time-recording mechanism, a spring for moving the carriage, intermittently strained by the clock-movement and released to intermittently move the carriage, a spring for returning the carriage to its original position after it has reached the limit of its travel, and means for causing an impression to be made by the time-recording mechanism upon a card or other suitable record-surface, whereby a record of the time may be made at any desired place upon the card or other record-surface along the line of movement of the carriage.

22. In a time-recorder the combination of a clock-movement, time-recording mechanism driven thereby and movable in a desired direction, means actuated by the clock-movement for moving the time-recording mechanism in such direction and means for causing an impression to be made by the time-recording mechanism upon a card or other suitable record-surface, whereby a record of the time may be made at any desired place upon the card or other record-surface along the line of movement of the time-recording mechanism.

23. In a time-recorder the combination of a clock-movement, time-recording mechanism driven thereby, a carriage suitably mounted upon supports and adapted to move thereon and to carry the time-recording mechanism, inking mechanism also mounted upon the carriage, means actuated by the clock-movement for moving the carriage along its supports, and means for causing an impression to be made by the time-recording mechanism upon a card or other suitable record-surface, and means for feeding the ink device, whereby a record of the time may be made at any desired place upon the card or other record-surface along the line of movement of the carriage.

24. In a time-recorder the combination of a clock-movement, time-recording mechanism driven thereby, a carriage suitably mounted upon supports and adapted to move thereon and to carry the time-recording mechanism, an impression-platen mounted upon the carriage and movable therewith, means actuated by the clock-movement for moving the carriage along its supports, and means for operating the impression-platen for causing an impression to be made by the time-recording mechanism upon a card or other suitable record-surface, whereby a record of the time may be made at any desired place upon the card or other record-surface along the line of movement of the carriage.

25. In a time-recorder adapted to make a record of the time of its operation upon a card or other record-surface the combination of a clock-movement, time-recording mechanism movable in two directions over the face of the card or other record-surface, a flexible spring-shaft connected with and driven by the clock-movement, a sliding connection between the flexible spring-shaft and the time-recording mechanism adapted to transmit the motion of the flexible spring-shaft to the time-recording mechanism irrespective of the relative positions of the shaft and sliding connection, whereby the time-recording mechanism may be moved in either or both directions without interference with the synchronous driving of the time-recording mechanism, means for moving the time-recording mechanism in each direction so as to bring the time-recording mechanism opposite any desired place upon the card or record-surface and suitable impression mechanism, whereby a record of the time may be made at any desired place upon the card or other record-surface irrespective of the movements of the time-recording mechanism.

26. In a time-recorder adapted to make a record of the time of its operation upon a card or other record-surface the combination of a clock-movement, time-recording mechanism movable in two directions over the face of the card or other record-surface, a flexible spring-shaft connected with and driven by the clock-movement, a sliding connection between the flexible shaft and the time-recording mechanism adapted to transmit the motion of the flexible spring-shaft to the time-recording mechanism irrespective of the relative positions of the shaft and sliding connection, whereby the time-recording mechanism may be moved in either or both directions without interference with the synchronous driving of the time-recording mechanism, means for moving the time-recording mechanism in each direction so as to bring the time-recording mechanism opposite any desired place upon the card or record-surface, and suitable impression mechanism, whereby a record of the time may be made at any desired place upon the card or other record-surface irrespective of the movements of the time-recording mechanism.

27. In a time-recorder adapted to make a record of the time of its operation upon a card or other record-surface the combination of a clock-movement, time-recording mechanism movable in two directions over the face of the card or other record-surface, a flexible spring-shaft connected with and driven by the clock-movement, and adapted to bend and move in one direction with the time-recording mechanism, a sliding connection between the flexible spring-shaft and the time-recording mechanism adapted to permit movement of the flexible shaft and sliding connection relatively to each other in the other direction of movement of the time-recording mechanism, whereby the motion of the flexible spring-shaft may be transmitted to the time-recording mechanism irrespective of the relative positions of the shaft and sliding connection, means for moving the time-recording mechanism in each direction so as to bring the time-recording mechanism opposite any desired place upon the card or record-surface, and suitable impression mechanism, whereby a record of the time may be made at any desired place upon the card or other record-surface irrespective of the movements of the time-recording mechanism.

28. In a time-recorder adapted to make a record of the time of its operation upon a card or other record-surface the combination of a clock-movement, time-recording mechanism, a carriage suitably mounted and adapted to move in two directions over the face of the card or other record-surface and adapted to carry the time-recording mechanism, a rotatable sleeve mounted upon the carriage, gearing connecting it with the time-recording mechanism to drive the latter, a flexible shaft connected with and driven by the clock-movement adapted to pass through and engage with the said sleeve, the shaft and sleeve being so arranged that the sleeve is free to slide upon the shaft but rotates therewith, whereby motion is transmitted through the flexible shaft to the rotatable sliding sleeve to the time-recording mechanism to drive it synchronously with the clock-movement irrespective of the movement of the carriage, means for moving the carriage in each direction so as to bring the time-recording mechanism opposite any desired place upon the card or record-surface, and suitable impression mechanism, whereby a record of the time may be made at any desired place upon the card or other record-surface irrespective of the movements of the carriage and time-recording mechanism.

29. In a time-recorder the combination of a clock-movement, time-recording mechanism movable in two directions, adjustable connections between the clock-movement and the time-recording mechanism to transmit motion from the former to the latter to drive the latter synchronously with the former adapted to permit of the movement of the time-recording mechanism in either or both directions without interference with the synchronous driving of the time-recording mechanism, means actuated by the clock-movement for moving the time-recording mechanism in one direction, means for moving it in the other direction, and suitable impression mechanism, whereby a record of the time may be made at any desired place upon a record-surface irrespective of the movements of the time-recording mechanism.

30. In a time-recorder adapted to make a record of the time of its operation upon a card or other record-surface the combination of a clock-movement, time-recording mechanism driven thereby, a carriage suitably mounted and movable in two directions over the face of the card or other record-surface and carrying the time-recording mechanism, means for moving the carriage in each direction so as to bring the time-recording mechanism opposite any desired place upon the card or record-surface, adjustable connections between the clock-movement and the time-recording mechanism to transmit motion from the former to the latter to drive the latter synchronously with the former adapted to permit of the movement of the carriage in either or both directions without interference with the synchronous driving of the time-recording mechanism, and suitable impression mechanism, whereby a record of the time may be made at any desired place upon the card or other record-surface irrespective of the movements of the time-recording mechanism.

31. In a time-recorder the combination of a clock-movement, time-recording mechanism movable in two directions, adjustable connections between the clock-movement and the time-recording mechanism to transmit motion from the former to the latter to drive the latter synchronously with the former adapted to permit of the movement of the time-recording mechanism in either or both directions without interference with the synchronous driving of the time-recording mechanism, means for moving the time-recording mechanism in each direction, a platen connected with the time-recording mechanism and movable therewith, an impression-operating device adapted to be actuated by the operator to bring the platen and the time-recording mechanism together to cause an impression of the time to be made upon a card or other suitable record-surface, adjustable connections between the impression-operating device and the platen, adapted to permit the movement of the platen with the carriage without interfering with the making of the time impressions upon the card or other record-surface, whereby a record of the time may be made at any desired place upon the card or other record-surface.

32. In a time-recorder the combination of a clock-movement, time-recording mechanism movable in two directions, a flexible shaft connected with and driven by the clock-movement, a sliding connection between the flexible shaft and the time-recording mechanism adapted to transmit the motion of the flexible shaft to the time-recording mechanism irrespective of the relative positions of the shaft and sliding connection, whereby the time-recording mechanism may be moved in either or both directions without interference with the synchronous driving of the time-recording mechanism, means actuated by the clock-movement for moving the time-recording mechanism in one direction, means for moving it in the other direction, and suitable impression mechanism, whereby a record of the time may be made at any desired place upon a record-surface irrespective of the movements of the time-recording mechanism.

33. In a time-recorder adapted to make a record of the time of its operation upon a card or other record-surface the combination of a clock-movement, time-recording mechanism driven thereby, a carriage suitably mounted and movable in two directions over the face of the card or other record-surface and carrying the time-recording mechanism, means for moving the carriage in each direction so as to bring the time-recording mechanism opposite any desired place upon the card or record-surface, a flexible shaft connected with and driven by the clock-movement, a sliding connection between the flexible shaft and the time-recording mechanism adapted to transmit the motion of the flexible shaft to the time-recording mechanism irrespective of the relative positions of the shaft and sliding connection, whereby the carriage may be moved in either or both directions without interference with the synchronous driving of the time-recording mechanism, and suitable impression mechanism, whereby a record of the time may be made at any desired place upon the card or other record-surface irrespective of the movements of the time-recording mechanism.

34. In a time-recorder the combination of a clock-movement, time-recording mechanism movable in two directions, a flexible shaft connected with and driven by the clock-movement, a sliding connection between the flexible shaft and the time-recording mechanism adapted to transmit the motion of the flexible shaft to the time-recording mechanism irrespective of the relative positions of the shaft and sliding connection, whereby the time-recording mechanism may be moved in either or both directions without interference with the synchronous driving of the time-recording mechanism, means for moving the time-recording mechanism in each direction, a platen connected with the time-recording mechanism and movable therewith, an impression-operating device adapted to be actuated by the operator to bring the platen and the time-recording mechanism together to cause an impression of the time to be made upon a card or other suitable record-surface, adjustable connections between the impression-operating device and the platen, adapted to permit the movement of the platen with the carriage without interfering with the making of the time impressions upon the card or other record-surface, whereby a record of the time may be made at any desired place upon the card or other record-surface.

35. In a time-recorder the combination of a clock-movement, time-recording mechanism driven thereby, a carriage suitably mounted upon supports and adapted to move vertically thereon and to carry the time-recording mechanism, a spring for moving the carriage downward, intermittently strained by the clock-movement and released to intermittently move the carriage downward, a spring adapted to counterbalance the weight of the carriage and to raise the carriage when released, to the uppermost limit of its travel, means for preventing upward movement of the carriage, means for releasing the carriage when it has reached the lowermost limit of its travel to permit the counterbalance-spring to raise the carriage, and means for causing an impression to be made by the time-recording mechanism upon a card or other suitable record-surface, whereby a record of the time may be made at any desired place upon the card or other record-surface along the line of movement of the carriage.

36. In a time-recorder the combination of a clock-movement, time-recording mechanism driven thereby, a carriage suitably mounted upon supports and adapted to move vertically thereon and to carry the time-recording mechanism, a spring for moving the carriage downward, intermittently strained by the clock-movement and released to intermittently move the carriage downward, a coiled spring adapted to counterbalance the weight of the carriage and to raise the carriage, when released, to the uppermost limit of its travel, an eccentric to which the coiled spring is connected, a flexible connection between the eccentric and the carriage to support the latter, adapted to wind and unwind around the eccentric as the spring coils or stretches to vary the leverage of the pull exerted by the coiled spring, whereby such pull may be equalized, means for preventing upward movement of the carriage, means for releasing the carriage when it has reached the lowermost limit of its travel to permit the counterbalance-spring to raise the carriage, and means for causing an impression to be made by the time-recording mechanism upon a card or other suitable record-surface, whereby a record of the time may be made at any desired place upon the card or other record-surface along the line of movement of the carriage.

37. In a time-recorder the combination of a clock-movement, time-recording mechanism driven thereby, a carriage suitably mounted upon supports and adapted to move thereon and to carry the time-recording mechanism, a spring for moving the carriage, a sector connected to and driven by the clock-movement in one direction, means for temporarily disconnecting the sector from the clock-movement, a spring for moving the carriage, connections between the spring and sector whereby when the sector is moved in one direction by the clock-movement the spring will be strained and when the sector is disconnected from the clock-movement, the spring will move the carriage a predetermined distance and the sector will be returned to its original position, a spring for returning the carriage to its original position after it has reached the limit of its travel, and means for causing an impression to be made by the time-recording mechanism upon a card or other suitable record-surface, whereby a record of the time may be made at any desired place upon the card or other record-surface along the line of movement of the carriage.

38. In a time-recorder the combination of a clock-movement, time-recording mechanism driven thereby, a carriage suitably mounted upon supports and adapted to move vertically thereon and to carry the time-recording mechanism, a spring for moving the carriage downward, intermittently strained by the clock-movement and released to intermittently move the carriage downward, a gear-wheel forming part of said connection and having part of its periphery unprovided with teeth, whereby the sector may be temporarily disconnected from the clock-movement, means for preventing upward movement of the carriage, means for releasing the carriage when it has reached the lowermost limit of its travel to permit the counterbalance-spring to raise the carriage, and means for causing an impression to be made by the time-recording mechanism upon a card or other suitable record-surface, whereby a record of the time may be made at any desired place upon the card or other record-surface along the line of movement of the carriage.

39. In a time-recorder the combination of a clock-movement, time-recording mechanism driven thereby, a carriage suitably mounted and movable in two directions and carrying the time-recording mechanism, means for moving the carriage in each direction, an impression-platen and inking-ribbon mounted upon the carriage and movable therewith, an impression-operating device adapted to be actuated by the operator to bring the platen and the time-recording mechanism together to cause an impression of the time to be made upon a card or other suitable record-surface, and to feed the ink-ribbon, adjustable connections between the impression-operating device and the platen and the ink-ribbon-feeding mechanism, adapted to permit the movement of the platen and ink-ribbon and its feeding mechanism with the carriage without interfering with the making of the time impressions upon the card or other record-surface or with the feeding of the ink-ribbon, whereby a record of the time may be made at any desired place upon the card or other record-surface.

40. In a time-recorder the combination of a clock-movement, time-recording mechanism driven thereby, a carriage suitably mounted in a movable frame and movable in one direction upon supports forming a part of said frame and carrying the time-recording mechanism, a movable frame for supporting the carriage movable in another direction in the time-recorder, means for moving the frame in one direction in the time-recorder, means for moving the carriage upon the frame in another direction, and means for causing an impression to be made by the time-recording mechanism upon a card or other suitable record-surface, whereby a record of the time may be made at any desired place upon the card or other record-surface.

41. In a time-recorder the combination of a clock-movement, time-recording mechanism driven thereby, a carriage suitably mounted in a movable frame and movable in one direction upon supports forming a part of said frame and carrying the time-recording mechanism, a movable frame for supporting the carriage movable in another direction in the time-recorder, means for moving the frame in one direction in the time-recorder, means actuated by the clock-movement for moving the carriage upon the frame in another direction, and means for causing an impression to be made by the time-recording mechanism upon a card or other suitable record-surface, whereby a record of the time may be made at any desired place upon the card or other record-surface.

42. In a time-recorder the combination of a clock-movement, time-recording mechanism driven thereby, a carriage suitably mounted in a movable frame and movable in one direction upon supports forming a part of said frame and carrying the time-recording mechanism, a movable frame for supporting the carriage movable in another direction in the time-recorder, means for moving the frame in one direction in the time-recorder, means for moving the carriage upon the frame in another direction, an impression-platen mounted upon the carriage and movable therewith, an impression-operating device adapted to be actuated by the operator to bring the platen and the time-recording mechanism together to cause an impression of the time to be made upon a card or other suitable record-surface, adjustable connection between the impression-operating device and the platen, adapted to permit the movement of the platen with the carriage and frame without interfering with the making of the time impressions upon the card or other record-surface, whereby a record of the time may be made at any desired place upon the card or other record-surface.

43. In a time-recorder the combination of a clock-movement, time-recording mechanism, a carriage mounted in a movable frame and movable in one direction upon supports forming a part of said frame and carrying the time-recording mechanism, a movable frame for supporting the carriage movable in another direction in the time-recorder, means for moving the frame in one direction in the time-recorder, means actuated by the clock-movement for moving the carriage upon the frame in another direction, adjustable connections between the clock-movement and the time-recording mechanism to transmit motion from the former to the latter to drive the latter synchronously with the former adapted to permit of the movement of the time-recording mechanism upon the carriage and frame in either or both directions without interference with the synchronous driving of the time-recording mechanism, an impression-platen mounted upon the carriage and movable therewith, an impression-operating device adapted to be actuated by the operator to bring the platen and the time-recording mechanism together to cause an impression of the time to be made upon a card or other suitable record-surface, adjustable connections between the impression-operating device and the platen, adapted to permit the movement of the platen with the carriage and frame without interfering with the making of the time impressions upon the card or other record-surface, whereby a record of the time may be made at any desired place upon the card or other record-surface.

44. In a time-recorder the combination of a clock-movement, time-recording mechanism driven thereby and mounted upon a carriage, a carriage mounted in a movable frame and movable in one direction upon supports forming a part of said frame and carrying the time-recording mechanism, a movable frame for supporting the carriage movable in another direction in the time-recorder, means for moving the frame in one direction in the time-recorder, means for moving the carriage upon the frame in another direction, whereby the time-recording mechanism is made movable in either one or both of two directions, and means for causing an impression to be made by the time-recording mechanism upon a card or other suitable record-surface, whereby a record of the time may be made at any desired place upon the card or other record-surface.

45. In a time-recorder the combination of a clock-movement, time-recording mechanism driven thereby, a carriage suitably mounted and movable in two directions and carrying the time-recording mechanism, means for moving the carriage in each direction, an impression-platen mounted upon a pressure-bar in the front of the machine and facing the time-recording mechanism, a pressure-bar in the front of the carriage and movable therewith, an impression-operating device adapted to be actuated by the operator to bring the platen and the time-recording mechanism together to cause an impression of the time to be made upon a card or other suitable record-surface, a pressure-plate mounted upon a plunger movable in bearings in the framework of the machine and connections between the plunger and the operating-lever for moving the pressure-plate, a lever mounted upon the carriage and connected with the pressure-bar and adapted to bear upon the pressure-plate and to be moved thereby to operate the impression-platen, the pressure-plate and lever being so arranged that the lever will always bear upon some portion of the surface of the pressure-plate, no matter what the position of the carriage, whereby the movement of the carriage will not interfere with the making of the time impressions upon the card or other record-surface and a record of the time may be made at any desired place upon said card or record-surface.

46. In a time-recorder the combination of a clock-movement, time-recording mechanism driven thereby, a carriage suitably mounted and movable in two directions and carrying the time-recording mechanism, means for moving the carriage in each direction, an impression-platen mounted upon a pressure-bar in the front of the machine and facing the time-recording mechanism, a pressure-bar in the front of the pressure-plate mounted upon a plunger movable in bearings in the framework of the machine and connections between the plunger and the operating-lever for moving the pressure-plate, a lever mounted upon the carriage and adapted to bear upon the pressure-plate and to be moved thereby to operate the impression-platen, two rods each connected with one end of the pressure-bar and with the lever bearing upon the pressure-plate, the pressure-plate and lever being so arranged that the lever will always bear upon some portion of the surface of the pressure-plate, no matter what the position of the carriage, whereby the movement of the carriage will not interfere with the making of the time impressions upon the card or other record-surface and a record of the time may be made at any desired place upon said card or record-surface.

47. In a time-recorder the combination of a clock-movement, time-recording mechanism driven thereby, a carriage suitably mounted upon supports and adapted to move vertically thereon and to carry the time-recording mechanism, a spring for moving the carriage downward intermittently strained by the clock-movement and released to intermittently move the carriage downward, a pawl connected with said spring and adapted to engage with a ratchet-wheel mounted in the framework of the machine to move the latter each time the spring is released, a gear-wheel connected with the ratchet-wheel and movable therewith and meshing with a rack secured upon the carriage to impart the intermittent motion of the spring to the carriage, a space upon the periphery of said gear-wheel unprovided with teeth, adapted to permit the carriage to rise when the said part comes opposite to the rack, a counterbalance-spring adapted to counterbalance the weight of the carriage and to raise the latter when the rack is released from the said gear-wheel, to the uppermost limit of its travel, a long tooth arranged upon the gear-wheel on one side of the bare space, a pin upon the rack placed thereon so that after the carriage has been raised, the long tooth will engage with the said pin and will move the rack and carriage downward each time the first-mentioned spring is released until the ordinary teeth of the gear-wheel engage with the teeth of the rack, and means for causing an impression to be made by the time-recording mechanism upon a card or other suitable record-surface, whereby a record of the time may be made at any desired place upon the card or other record-surface along the line of movement of the carriage.

48. In a time-recorder the combination of a clock-movement, time-recording mechanism driven thereby, a carriage suitably mounted and adapted to move in two directions, means automatically actuated by the clock-movement for moving the carriage in one direction, an operating device under the control of the operator adapted to move the carriage in the other direction, a locking device adapted to lock the said operating device in said position and suitable impression mechanism, whereby movement of the carriage may be prevented.

49. In a recorder adapted to make a record upon a card or other record-surface the combination of suitable impression mechanism and means for actuating it, of a lock to prevent the operation of the impression mechanism, a card or other removable record-surface having a portion cut away, a projection normally extending into the path of the card when inserted into the machine and connected with said lock, the said cut-away portion of the card and the said projection being so proportioned and arranged that when the cut-away portion of the card registers with the said projection, the projection will not be struck and the lock will prevent the impression mechanism from being operated, but when the cut-away portion does not register with the said projection, the card will strike the said projection when fully inserted into the machine and will remove the lock from its locking position to permit the operation of the impression mechanism, whereby the recording mechanism cannot be operated to make an impression until the card or other record-surface has been properly inserted in place to receive the impression.

50. In a recorder adapted to make a record upon a card or other removable record-surface the combination with suitable impression mechanism and means for actuating it, of a lock to prevent the operation of the impression mechanism arranged to normally lie in the path of such impression mechanism to prevent its operation, but not touching such operating mechanism, whereby the locking-lever may be withdrawn from its locking position without friction with the impression-operating mechanism, a card or other removable record-surface having a portion cut away, a projection normally extending into the path of the card when inserted into the machine and connected with the said lock, the said cut-away portion of the card and the said projection being so proportioned and arranged that when the cut-away portion of the card registers with the said projection, the projection will not be struck and the lock will prevent the impression mechanism from being operated, but when the cut-away portion does not register with the said projection, the card will strike the said projection when fully inserted into the machine and will remove the lock from its locking position to permit the operation of the impression mechanism, whereby the recording mechanism cannot be operated to make an impression until the card or other record-surface has been properly inserted in place to receive the impression.

51. In a recorder adapted to make a record upon a card or other removable record-surface the combination with suitable impression mechanism and means for actuating it, of a lock to prevent the operation of the impression mechanism, a card or other removable record-surface having a portion cut away, a projection normally extending into the path of the card when inserted into the machine, connections between the said projection and the lock including a spring for transmitting motion from the projection to the lock whereby when the projection is struck by the card, motion will be transmitted through the connections and spring to move the lock out of its operative position and whereby this power will be stored in the spring if the lock is frictionally held by the impression-operating mechanism and the lock will be removed from operative position when freed from such frictional holding, the said cut-away portion of the card and the said projection being so proportioned and arranged that when the cut-away portion of the card registers with the said projection, the projection will not be struck and the lock will prevent the impression mechanism from being operated but when the cut-away portion does not register with the said projection, the card will strike the said projection when fully inserted into the machine and will remove the lock from its locking position to permit the operation of the impression mechanism, whereby the recording mechanism cannot be operated to make an impression until the card or other record-surface has been properly inserted in place to receive the impression.

52. In a time-recorder adapted to make a record upon a card or other removable record-surface the combination with suitable impression mechanism and means for actuating it, of a lock adapted to prevent the operation of the impression mechanism, a projection extending normally into the path of the card when inserted into the time-recorder and adapted to be struck by the card when the latter is properly inserted in the recorder, connections between the said projection and the lock including a spring for transmitting motion from the projection and the lock to move the latter out of operative position, whereby when the said projection is struck by the card, motion will be transmitted through the said spring and remove the lock from operative position and whereby the said power will be stored in the spring in case the lock cannot then be moved to move the latter when released and whereby injury to the card may be avoided.

53. In a time-recorder adapted to make a record of the time upon a card or other removable record-surface the combination with suitable time-recording mechanism and means for actuating it, and suitable impression mechanism and means for actuating it, of a lock to prevent the operation of the impression mechanism arranged to normally lie in the path of such impression mechanism to prevent its operation, but not touching such operating mechanism, whereby the locking-lever may be withdrawn from its locking position without friction with the impression-operating mechanism, a card or other removable record-surface having a portion cut away, a projection normally extending into the path of the card when inserted into the machine and connected with the said lock, the said cut-away portion of the card and the said projection being so proportioned and arranged that when the cut-away portion of the card registers with the said projection, the projection will not be struck and the lock will prevent the impression mechanism from being operated, but when the cut-away portion does not register with the said projection, the card will strike the said projection when fully inserted into the machine and will remove the lock from its locking position to permit the operation of the impression mechanism, whereby the recording mechanism cannot be operated to make an impression until the card or other record-surface has been properly inserted in place to receive the impression.

54. In a time-recorder adapted to make a record of the time upon a card or other removable record-surface the combination with suitable time-recording mechanism and means for actuating it, and suitable impression mechanism and means for actuating it, of a lock to prevent the operation of the impression mechanism, a card or other removable record-surface having a portion cut away, a projection normally extending into the path of the card when inserted into the machine, connections between the said projection and the lock including a spring for transmitting motion from the projection to the lock whereby when the projection is struck by the card, motion will be transmitted through the connections and spring to move the lock out of its operative position and whereby this power will be stored in the spring if the lock is frictionally held by the impression-operating mechanism and the lock will be removed from operative position when freed from such frictional holding, the said cut-away portion of the card and the said projection being so proportioned and arranged that when the cut-away portion of the card registers with the said projection, the projection will not be struck and the lock will prevent the impression mechanism from being operated but when the cut-away portion does not register with the said projection, the card will strike the said projection when fully inserted into the machine and will remove the lock from its locking position to permit the operation of the impression mechanism, whereby the recording mechanism cannot be operated to make an impression until the card or other record-surface has been properly inserted in place to receive the impression.

55. In a time-recorder adapted to make a record of the time upon a card or other removable record-surface the combination with suitable time-recording mechanism and means for actuating it, and suitable impression mechanism and means for actuating it, of a lock adapted to prevent the operation of the impression mechanism, a projection extending normally into the path of the card when inserted into the time-recorder and adapted to be struck by the card when the latter is properly inserted in the recorder, connections between the said projection and the lock including a spring for transmitting motion from the projection and the lock to move the latter out of operative position, whereby when the said projection is struck by the card, motion will be transmitted through the said spring and remove the lock from operative position and whereby the said power will be stored in the spring in case the lock cannot then be moved to move the latter when released and whereby injury to the card may be avoided.

56. In a time-recorder adapted to make a record of the time upon a card or other removable record-surface the combination with suitable time-recording mechanism and means for actuating it, and suitable impression mechanism and means for actuating it, of a lock to prevent the operation of the impression mechanism, a card or other removable record-surface having a portion cut away, a projection normally extending into the path of the card when inserted into the machine and connected with said lock, the said cut-away portion of the card and the said projection being so proportioned and arranged that when the cut-away portion of the card registers with the said projection, the projection will not be struck and the lock will prevent the impression mechanism from being operated, but when the cut-away portion does not register with the said projection, the card will strike the said projection when fully inserted into the machine and will remove the lock from its locking position to permit the operation of the impression mechanism, whereby the recording mechanism cannot be operated to make an impression until the card or other record-surface has been properly inserted in place to receive the impression.

57. In a recorder adapted to make a record upon a card or other removable record-surface, the combination with suitable recording mechanism and suitable impression mechanism and means for actuating it, of a lock adapted to prevent the operation of the impression mechanism, means connected with the lock for removing it from its locking position to permit the operation of the impression mechanism, having a portion projecting into the path of the card or other removable record-surface, and a card or other removable record-surface having a portion cut away, the cut-away portion being so placed that, when the card or other record-surface is properly inserted in the machine, the cut-away portion will not register with the portion of the means for removing the lock projecting into its path and the card will strike such projecting portion and actuate the said means to remove the lock from its locking position, but when the card is improperly inserted in the machine, the cut-away portion will register with the said projecting portion and the card will not strike or actuate the said means, whereby the recording mechanism cannot be operated to make an impression until the card or other record-surface has been properly inserted in place to receive the impression.

58. In a time-recorder the combination of a clock-movement, time-recording mechanism driven thereby, a carriage suitably mounted and movable in two directions and carrying the time-recording mechanism, an impression-platen mounted upon the carriage, means for moving the carriage in each direction, a pressure-plate connected with the impression-operating device and adapted to be moved thereby, a movable member mounted upon the carriage and connected with the impression-platen and adapted to bear upon the impression-plate and to be moved thereby to operate the impression-platen, the pressure-plate and movable member being so arranged that the latter will always bear upon some portion of the surface of the pressure-plate, no matter what the position of the carriage, whereby the movement of the carriage will not interfere with the making of the time impressions upon the card or other record-surface and a record of the time may be made at any desired place upon said card or record-surface.

59. In a recorder adapted to make a record upon a card or other removable record-surface, a card or other removable record-surface having a portion cut away, the said cut-away portion being so arranged upon the card that when the card is inserted properly in the machine the cut-away portion will not register with a projection extending into the path of the card and the card will strike and move the projection to remove the lock upon the impression mechanism from its locking position to permit the operation of such mechanism and, when a card is inserted improperly in the machine, the cut-away portion will register with the said projecting portion so that the card will not strike the same and will not remove the said lock from its locking position.

In testimony whereof I have signed my name to this specification in the presence of two subscribing witnesses.

WILLARD LE GRAND BUNDY.

Witnesses:
JOSHUA W. CAPEN,
A. WARD FORD.